US009576109B1

(12) United States Patent
Grandinetti et al.

(10) Patent No.: US 9,576,109 B1
(45) Date of Patent: Feb. 21, 2017

(54) CONTENT REVENUE ALLOCATION

(75) Inventors: Russell C. Grandinetti, Seattle, WA (US); Gregory M. Hart, Seattle, WA (US); Jeffrey P. Bezos, Greater Seattle Area, WA (US); Melissa C. Kirmayer, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 868 days.

(21) Appl. No.: 12/707,184

(22) Filed: Feb. 17, 2010

(51) Int. Cl.
*G06F 21/00* (2013.01)

(52) U.S. Cl.
CPC .................................... *G06F 21/00* (2013.01)

(58) Field of Classification Search
CPC ...................................................... G06F 21/10
USPC ........................................................... 705/53
See application file for complete search history.

(56) References Cited

U.S. PATENT DOCUMENTS

| 6,282,653 B1* | 8/2001 | Berstis et al. .................. 726/26 |
|---|---|---|
| 6,411,936 B1* | 6/2002 | Sanders ....................... 705/7.32 |
| 7,003,486 B1* | 2/2006 | Condamoor et al. ........... 705/37 |
| 7,058,599 B2* | 6/2006 | Hanks et al. ................. 705/27.1 |
| 7,082,540 B1* | 7/2006 | Ruparelia et al. ............ 713/193 |
| 7,315,836 B1* | 1/2008 | Elliott .......................... 705/36 R |
| 7,343,321 B1* | 3/2008 | Hill et al. ..................... 705/27.1 |
| 7,353,206 B2* | 4/2008 | Entani ............................. 705/52 |
| 7,383,230 B2* | 6/2008 | Wolff .................. G06Q 20/382 235/379 |
| 7,493,262 B2* | 2/2009 | Hagelin ........................ 705/310 |
| 7,505,936 B2* | 3/2009 | Huffman et al. ............... 705/37 |
| 7,747,474 B2* | 6/2010 | Miloslavsky et al. ....... 705/26.1 |
| 7,849,393 B1* | 12/2010 | Hendricks et al. ........... 715/203 |
| 7,962,511 B2* | 6/2011 | Barney ......................... 707/776 |
| 8,180,792 B2* | 5/2012 | Fanning et al. ............. 707/781 |
| 8,260,713 B2* | 9/2012 | Holcombe ............. G06Q 30/00 705/1.1 |
| 8,799,107 B1* | 8/2014 | Dean et al. .................. 705/26.8 |
| 2001/0047329 A1* | 11/2001 | Ashby ............................ 705/39 |
| 2002/0004751 A1* | 1/2002 | Seki et al. ..................... 705/20 |
| 2003/0028413 A1* | 2/2003 | White et al. ................... 705/10 |
| 2004/0030653 A1* | 2/2004 | Christensen ................... 705/51 |
| 2004/0093279 A1* | 5/2004 | Yamanoue et al. ............ 705/26 |
| 2004/0158473 A1* | 8/2004 | Contractor ....................... 705/1 |
| 2004/0220842 A1* | 11/2004 | Barney ........................... 705/7 |
| 2006/0106677 A1* | 5/2006 | Sawada et al. ................ 705/26 |
| 2006/0212403 A1* | 9/2006 | Fanning et al. ................ 705/52 |
| 2006/0282335 A1* | 12/2006 | Hanks et al. .................. 705/26 |
| 2007/0083558 A1* | 4/2007 | Martinez .................... 707/104.1 |
| 2007/0208669 A1* | 9/2007 | Rivette et al. ................. 705/59 |
| 2008/0071561 A1* | 3/2008 | Holcombe ........................ 705/1 |

(Continued)

OTHER PUBLICATIONS

Computing in an Internet World, Daniel Steven, Publishlawyer.com, Jun. 9, 2007.*

(Continued)

*Primary Examiner* — Alexis Casey
(74) *Attorney, Agent, or Firm* — Lee & Hayes, PLLC (57) ABSTRACT

Revenue generated through electronic book sales (and other transactions, such as rental, sample, leasing, etc.) is allocated among rights holders and other parties based on a ranking of common work distributed in electronic book form or any other form (e.g., paperback, hardcover, audio). As the ranking changes, the revenue allocated to the rights holder changes. The changes may be made in real-time as revenue and metric data is collected.

27 Claims, 9 Drawing Sheets

(56) References Cited

U.S. PATENT DOCUMENTS

2008/0189283 A1* 8/2008 Quoc et al. .................. 707/9
2008/0195459 A1* 8/2008 Stinski ....................... 705/10
2010/0161499 A1* 6/2010 Holcombe et al. .......... 705/310

OTHER PUBLICATIONS

Quick Guide to Book Contract Trouble Spots, Daniel Steven, Publishlawyer.com, Aug. 20, 2008.*
Inside Publishing—Advance and Royalties, Chris Holifield, Aug. 17, 2007.*
Contracts Made Simple—Unit 1: Riches in those Rising Royalties, Michael Barker, fasttrackwriting.com, Jul. 8, 2007.*
Get it in Writing: A few nuances of book publishing, Monica Petraglia McCabe, Business Law Today, American Bar Association, vol. 16, No. 1, Sep./Oct. 2006.*
Book Publishing Agreements: What You Absolutely, Positively Must Know, Daniel Steven, Publishlawyer.com, Jun. 8, 2007.*

* cited by examiner

CONTENT REVENUE ALLOCATION

BACKGROUND

A large and growing population of people enjoy entertainment through consumption of digital content items, such as music, movies, images, books and other types of digital content. Many people today consume digital content through a wide variety of electronic devices. Among these electronic devices are electronic book readers, cellular telephones, personal digital assistants (PDAs), portable media players, tablets, netbooks and the like.

As more content is made available in digital form, the economic landscape for content creation, production and distribution is evolving. This is particularly the case for digital music and electronic books (or "eBooks"). Such content items may be distributed online to electronic devices, without production of a portable physical medium, such as a tape cassette, CD or physical paper-based book. As a result, many of the transaction costs associated with traditional channels of distribution on physical media are being reduced or eliminated entirely. This leads to the possibility of new economic models for creation and distribution of digital content items.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes an architecture and techniques in which revenue generated through electronic book sales (and other transactions, such as rental, sample and leasing) is periodically allocated among parties (e.g., rights holders, distributors, retailers) based on various metrics. As one scenario, revenue allocation is based upon a sales metric for the electronic book (or "eBook"), either alone or in conjunction with some or all other versions of the same or similar work (referred to herein as a "common work"), such as paperback, hardcover and audio. The sales metric may be measured by the ranking of the common work on one or more lists or a composite score of such lists. As the ranking of the common work rises and falls, the revenue amount allocated to the rights holder is modified. Generally, as the common work moves toward the top of the ranking list, the rights holder may be allocated a larger portion or percentage of the revenue received on sales or other transactions involving the electronic book for that common work. In some instances, the rights holder may be allocated all of the revenue. For instance, if the common work becomes popular and lands in one of the top spots on a bestsellers list, the rights holder may be allocated 100% of the revenue derived from transactions involving the electronic book for that common work.

Revenue allocation may be performed periodically or in real-time, with current transaction data being captured upon distribution of the electronic book or other form of the common work and used to compute the allocation amounts. The rights holders may view online reports of the revenue allocation details to stay current on sales and other transaction data, as well as the revenue percentages and totals being allocated.

Additionally, if the work is currently only manifest in paper form (e.g., paperback or hardcover), the terms of the revenue allocation arrangement may be provided to the rights holders as a way to entice publication of an electronic version of the common work, such as an eBook. For instance, suppose a hardcover book is placed on a bestsellers list. The rights holders may be interested to know that if an eBook version is published, the rights holders would be allocated a certain portion of the revenue derived from transactions involving that eBook. For example, if the eBook becomes a top 5 eBook bestseller, the author may receive 100% of the revenue derived from sales of the eBook. In another embodiment, the revenue allocated for the ebook may be based upon the ranking of the hardcover book.

For discussion purposes, the architecture and techniques are described in the context of distributing electronic books. The terms "electronic book" and/or "eBook," as used herein, include electronic or digital representations of printed works (or portions of printed works), as well as digital content that may include text, multimedia, hypertext and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc. However, certain concepts described herein are also applicable to other types of digital content items, such as music, audio books, video and other content items that people watch, listens to, consume or otherwise experience.

Figure 1:
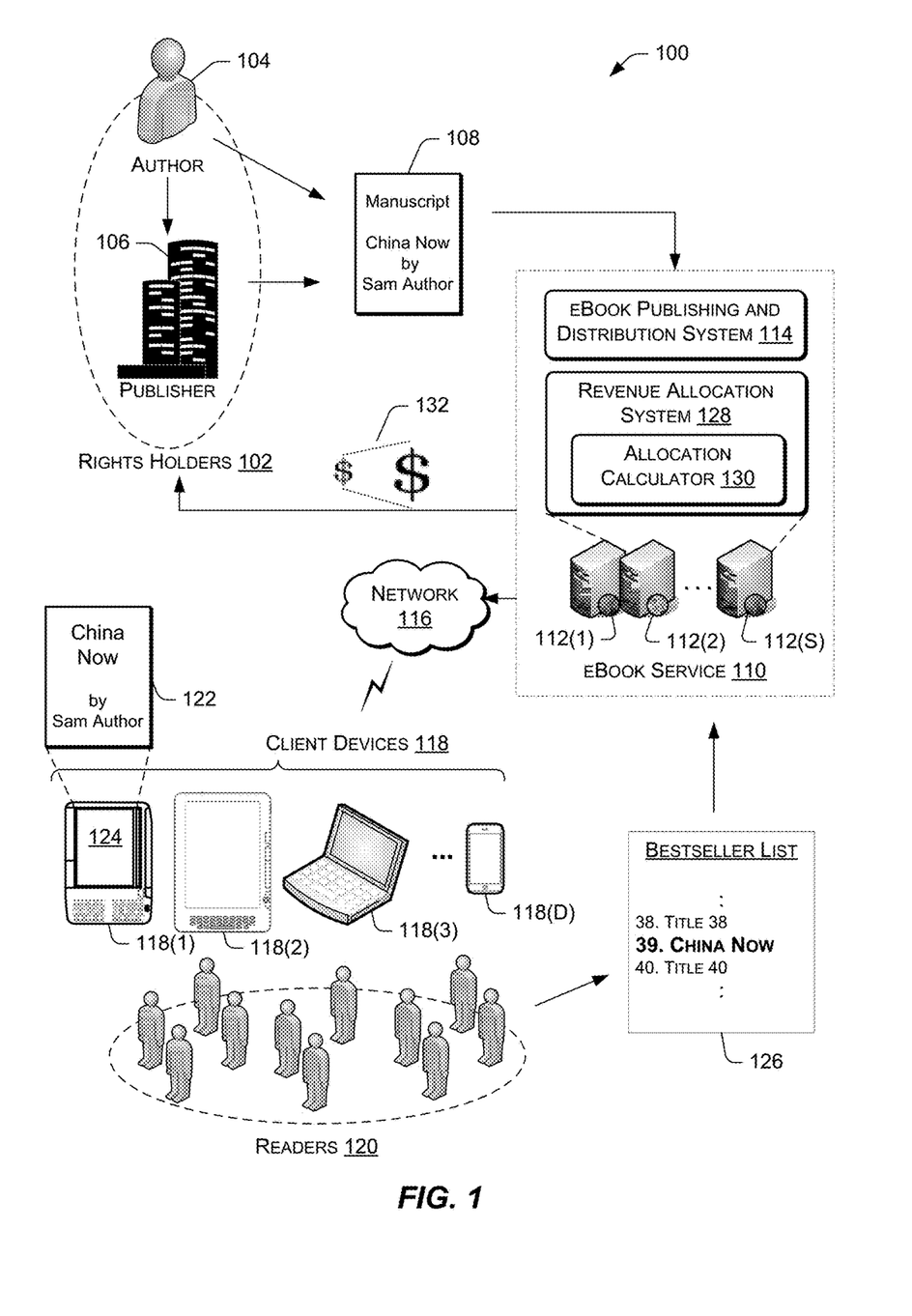
FIG. 1 illustrates an architecture of computers and networks in which various models for periodic revenue allocation for electronic book transactions may be implemented.

FIG. 1 illustrates an example architecture 100 in which periodic revenue allocation for electronic book transactions may be implemented. The architecture 100 permits various rights holders 102 to create and produce works for electronic distribution. As shown here, the rights holders 102 may include at least an author 104 and/or a publisher 106. In general, a rights holder 102 may be any person or entity that holds or has rights to reproduce, distribute, import, export, create derivatives, perform or display publicly, sell or transmit the content. In some instances, there may be more than one rights holder for the content (e.g., a publisher may have rights to distribute the content in certain countries, while the author retains the rights to distribute the content in other countries; or publisher A may have the rights to distribute a book in printed form and publisher B may have the rights to distribute a book in eBook form). Examples of rights holders for various types of digital content include, but are not limited to, authors, publishers, music labels, movie studios, artists, songwriters, performers and delegates.

FIG. 1 illustrates that one or more rights holders 102 produce a manuscript 108, such as the illustrated fictitious manuscript "China Now" by a fictitious author named "Sam Author," and provide the manuscript to an eBook service 110. The manuscript may be created and supplied by the author 104 individually, with the assistance of a publisher 106 or via other arrangements. The manuscript 108 may be a paper-based product (e.g., printed media) that is physically sent to the eBook service 110 or a digital file that can be transferred on a tangible storage medium (e.g., a memory stick) or over a network.

The eBook service 110 is illustrated as being hosted on servers 112(1), 112(2), . . . , 112(S), which collectively have processing and storage capabilities to perform a myriad of operations pertaining to establishing an eBook distribution and economic environment. The servers 112(1)-(S) may be embodied in any number of ways, including as a single server, a cluster of servers, a server farm or data center and so forth, although other server architectures (e.g., a mainframe architecture) may also be used.

The eBook service 110 may include an eBook publishing and distribution system 114 that is hosted on the servers 112(1)-(S). The eBook publishing and distribution system 114 enables formatting and publishing of an eBook based on the manuscript 108. The eBook publishing and distribution system 114 may further support online retailing of the eBook (e.g., via a website) and may facilitate electronic distribution of the eBook. In some implementations, the servers 112(1)-(S) store the eBooks, although in other implementations, the servers merely facilitate publication, purchase and delivery of the eBooks.

As shown in FIG. 1, the eBook service 110 may distribute the eBook electronically over a network 116 to one or more client devices 118 that are used by a population of readers 120. The network 116 is representative of any one or combination of multiple different types of networks, such as the Internet, cable networks, cellular networks, wireless networks (e.g., wifi, cellular) and wired networks. The reader population 120 may be a defined group of people (e.g., a club or group that involves registration or subscription) or an open ended collection of people (e.g., all readers).

The client devices 118 are capable of storing and presenting the eBook. Representative devices 118 are illustrated as including dedicated eBook reader devices 118(1) and 118(2), notebook computing devices 118(3), portable multi-function communications devices 118(D) that are implemented with a reader application or any other type of device capable of receiving and presenting the eBook. Although four representative devices are shown, many other devices may be used, including desktop computers, tablets, PDAs, portable media players, entertainment devices, netbooks, gaming consoles, DVD players, media centers and the like. In some cases, the client devices 118 are capable of allowing the readers to access the eBook service 110 over the network 116, browse various titles, download samples of the eBooks, order the eBooks and authorize payment for the eBooks. In this manner, the eBook service 110 facilitates shopping, purchase and/or delivery of eBooks and other content items for the various client devices 118. In addition, the eBook service 110 may also track the manner through which the client device 118 accesses or obtains the content. For example, the eBook service may track that a client device 118 downloaded the content via a wired connection to a PC or via a wireless connection to an eBook reader.

When all or a portion of the eBook is downloaded from the eBook service 110, in one embodiment, it is stored locally on the client device 118 for subsequent access by the reader. Suppose, for example, that a reader uses the eBook reader device 118(1) to order an eBook version of the work "China Now" that was distributed based on the manuscript 108 submitted by the rights holders 102. The eBook is transmitted over the network 116 to the eBook reader device 118(1) and stored in memory. Parts of this transmission, including the last segment to the reader device 118(1), may be over a wireless connection. When the user selects to read this eBook, the contents are rendered/presented on the eBook reader device 118(1). In FIG. 1, a cover image 122 of the eBook titled "China Now" is shown rendered on a display 124 of the eBook reader device 118(1).

As readers in the population 120 purchase or otherwise engage in transactions involving the eBook version of the work "China Now," as well as other derivatives of the common work (e.g., audio book, hardcover, paperback), the ranking or metric of the title is measured. Ranking may be measured in any number of different ways. One example ranking metric is sales rank, measured over the life of a title or over discrete or selected periods of time (e.g., monthly, quarterly, yearly). Sales ranking may also be tied to other rankings relative to other works. For instance, eBooks that have more sales as compared to other eBooks may be said to have a stronger sales rank.

Sales rank may further be assessed by lists, such as a bestseller lists. In FIG. 1, a bestseller list 126 is provided to show rankings of various titles. Here, the title "China Now" is ranked $39^{th}$ on the bestseller list 126. The list 126 may reflect measured sales of electronic books only or a combination of some or all derivatives of a title, such as electronic books, audio books, hardcover, paperback and so forth. One possible list 126 that may be used in the architecture 100 to rank a book in physical form is the New York Times® Best Sellers for Paperback Mass-Market Fiction or any other New York Times® Best Sellers list. The bestseller list may reflect a measure of different forms of the common work, intervals (such as lifetime sales or sales velocity over discrete periods) or any other aspect of the work. Accordingly, as more people in the population 120 purchase or otherwise engage in transactions involving the title "China Now," the title moves up or climbs the list 126. As sales begin to decrease, the title may move down or fall on the list 126.

In addition to sales rank, other example metrics might include total revenue generated over the life of a work or over discrete intervals, number of downloads of a digital version, size of a digital download, number of sample downloads, sales or revenue velocity, rentals, average review of a work, total books sold by an author, total books sold in a series, ranking of other works written by the author, ranking of other works in the series, duration of time the book remains on a bestseller list, duration of time other books by the same author remain on the bestseller list, duration of time other books within a series remain on the bestseller list, number of readers that complete the electronic book, ranking of a movie based on the work, number of additional sales of other works by the author after having purchased the eBook and so forth. These are merely representative, and many other metrics may be employed.

The eBook service 110 may further include a revenue allocation system 128 that is hosted on the servers 112(1)-(S) to allocate revenue (gross or net) generated from transactions involving the eBook. These transactions may include essentially any activity involving the eBook from which monetary sums or other units of value are generated. Such transactions may include, for example, sales, leases, rentals, trials, viewings, promotions, downloads, options to buy and so forth. The revenue allocation system 128 allocates the revenue generated from the eBook transactions among various parties, including the rights holders 102 and the eBook service 110. In embodiments in which the eBook service 110 also receives information regarding revenue generated from other forms of the common work (e.g., physical books, audio books), the revenue allocated may represent revenue generated from all forms of the work. Still further, an additional share of revenue may be allocated to a rights holder depending upon how the content is access or obtained by the client devices 118. For example, if a percentage of the client devices 118 are netbooks and download the eBook via a wifi connection, the revenue allocation system 128 may provide an increased portion of the revenue as the cost to distribute the eBook was less than it would have been if it had been delivered to an eBook reader over a cellular connection. In a similar manner, an additional share of revenue may be allocated to a rights holder depending upon the size of the digital item downloaded.

Where there is more than one rights holders 102, the revenue allocation system 128 may also determine the revenue allocation among the various rights holders, such as the author 104 and the publisher 106.

The revenue allocation system 128 implements an allocation function/calculator 130 that derives amounts to allocate to the various parties based on one or more metrics measured for the eBook. As noted above, one metric is sales of the eBook, alone or in combination with other versions of the work (e.g., hardcover, softback, audio, etc.), as indicated by a ranking on a list, such as a bestseller list 126. The allocation function/calculator 130 may use data from the ranking, such as the bestseller list 126, to determine how much or what percentage of the revenue to allocate to the rights holders 102 and how much to allocate to other parties, such as the eBook service 110. In some implementations, the other parties, in addition to the rights holders 102 may include electronic publishers, electronic distributors and online retailers. The eBook service 110 may function as one or more of these other parties that are in addition to the rights holders 102. These parties may belong to the same legal entity or be legally separate from one another.

In one scenario, the portion being allocated to the rights holder(s) 102 increases as the work rises in the rankings. Thus, as the title "China Now" moves up the bestseller list 126, a larger portion of the revenue generated by sales of the eBook is allocated to the rights holder(s) 102. In other scenarios, simply achieving a certain level on a bestseller list 126 may provide a defined allocated proportion of the revenue, perhaps even all of the revenue, to the rights holder(s) 102. Various models may be employed by the allocation function/calculator 130 when determining allocation among the parties. Representative models are described below in more detail with reference to FIGS. 3-4.

Accordingly, the revenue allocation system 128 periodically adjusts an amount being allocated to the rights holder(s) 102, as graphically illustrated in FIG. 1 by the changing "$" sign 132, depending upon the change in one or more metrics measured for the work. The adjustments may be made in real-time as up-to-the-minute metric data is aggregated from various sources (such as the sales data, rankings, etc.) and input into the allocation function/calculator 130. In such an environment, the rights holder(s) 102 may view online, real-time reports of the metrics and the revenue allocations. Alternatively, the revenue adjustments may be based on data that is aggregated periodically and used by the allocation function/calculator 130 at routine intervals to allocate revenue among the parties. For example, the revenue adjustments may be based upon data for a selected period of time (e.g., weekly, monthly, yearly).

While the eBook service 110 is described above as including the eBook publishing and distribution system 114 and revenue allocation system 128, in alternative embodiments some or all of the components of the eBook service 110 may be separate. For example, the eBook publishing and distribution system 114 may be provided by a different entity than the revenue allocation system 128. In a similar manner, functions of each system may be distributed. For example, the eBook publishing and distribution system 114 may be implemented by multiple parties, one party implementing the publishing and another implementing the distribution.

Figure 2:
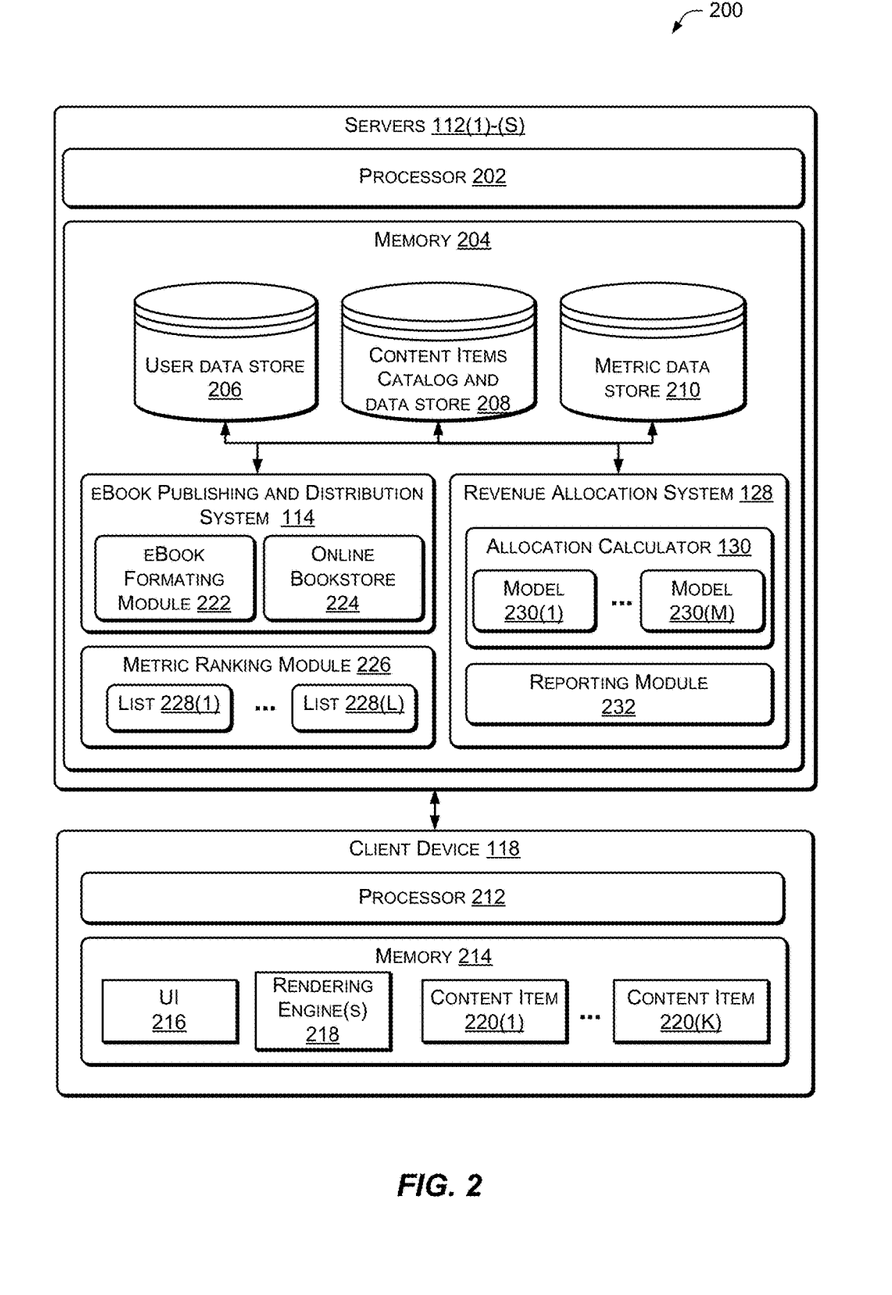
FIG. 2 is a block diagram illustrating selected modules in a computing system that facilitate distribution of electronic books to a client device and that periodically adjust revenue to be allocated to rights holders of the electronic books.

FIG. 2 shows selected modules in a representative computer system 200 that may be used to distribute electronic books and other content items to users and to periodically allocate the revenue to the rights holder(s) of the electronic books based on metric data. The system 200 includes the servers 112(1)-(S) of the eBook service 110 and any of the client devices 118(1)-(D), as represented by a client device 118. The servers 112(1)-(S) collectively provide processing capabilities 202 and memory 204. The memory 204 may include volatile and nonvolatile memory and/or removable and non-removable media implemented in any type or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems or any other medium which can be used to store the desired information and which can be accessed by a computing device.

Stored in the memory 204 are multiple data stores, including a user data store 206, a content items catalog and data store 208 and a metric data store 210. The user data store 206 maintains user data, such as the readers in the population 120. User data may be established in response to users registering or subscribing with the eBook service 110 or simply visiting an online site associated with the service 110, such as a retail site. The content items catalog and data store 208 maintains a catalog of digital works, such as music, eBooks, movies and so on. Additionally, the content items catalog and data store 208 may further store the works themselves that can be downloaded to the client device 118. In this manner, when the client device 118 accesses the servers 112(1)-(S), the user is able to browse the catalog for various content items and then purchase and download that content item from the content items catalog and data store 208. In other implementations, the servers 112(1)-(S) may support the catalog, but facilitate delivery of the content items through other mechanisms.

The metric data store 210 stores data collected from one or more sources pertaining to metrics of various content items, such as eBooks. The metric data store 210 may store data pertaining to any metric that is being used to determine allocation of revenue from eBook transactions. For instance, the metric data store 210 may store data for sales, downloads, viewings, samples and so forth that is collected by the eBook service 110 as a result of requests from the reader population 120. The metric data store 210 may further maintain rankings or comparisons of content items relative to other content items.

The client device 118 has a processor 212 and memory 214 (e.g., volatile, non-volatile, etc.). A user interface (UI) 216 is stored in the memory 214 and executed on the processor 212. The UI 216 allows the client device 118 to access the eBook service 110 and request various content items. In one implementation, the UI 216 is a browser or other application that renders pages or content served by the servers 112(1)-(S).

One or more rendering engines 218 are also stored at the client device 118 in memory 214. These rendering engine(s) 218 enable the user to experience any of the content items 220(1), . . . , 220(K), which may be stored in memory 214 (as shown) or stored remotely. For instance, one type of rendering engine 218 is an eBook reader application that facilitates display/presentation of a digital eBook or other text-based content items. In this case, the content items 220(1)-(K) may be eBooks purchased and downloaded from the servers 112(1)-(S). Other types of rendering engines 218 may include an audio player to play music or other audio-based content items or a video player that enables playback of video or other video-based content items. The rendering engine may also be a multimedia player, allowing playback of multiple types of content items.

In the implementation of FIG. 2, the eBook publishing and distribution system 114 and the revenue allocation system 128 are software-enabled systems that reside in the memory 204 and execute on the processor 202. The eBook publishing and distribution system 114 includes an eBook formatting module 222 to convert a manuscript into an electronic book that can be downloaded and rendered on an eBook reader device 118 or by reader applications on other types of electronic devices such as phones, PDAs, tablets and so forth. Once formatted, the eBook is in a publishable form for distribution to the client device 118.

The eBook publishing and distribution system 114 may further include and/or communicate with an online bookstore 224 or retailer that markets the various media items from the content items catalog and data store 208, including eBooks. The client device 118 may access the online bookstore 224 over a network, using the UI 216. The client may elect to engage in various activities, such as download a sample, view various reader reviews, purchase the eBook, rent the eBook and so forth. Various engagements may cause transactions that result in generation of revenue. For instance, purchasing or renting the eBook may generate revenue in the form of a payment from the reader to the eBook service 110.

A metric ranking module 226 is stored in memory 204 and executable on the processor 202 to rank eBooks and other content items according to the metric, such as sales or sales velocity. Although shown separately, the metric ranking module 226 may be implemented as part of the revenue allocation system 128. In some implementations, the metric ranking module 226 ranks eBooks relative to other eBooks and/or physical books to other physical books. In this case, the metric ranking module 226 may employ one or more lists, such as the lists 228(1), . . . , 228(L). The lists may be any type of list that characterizes the eBooks or physical books (or other content items) in terms of a rank metric. The lists may include, for example, bestseller lists, popularity lists, sales volume lists and so forth.

Alternatively, the metric ranking module 226 may simply track and/or compute statistics pertaining to the metrics for individual eBooks or other items, rather than in relation to other eBooks/items. For instance, the revenue adjustments may be based on pure rank of the eBook, like selling a threshold number of copies or being sampled a threshold number of times.

The revenue allocation system 128 determines revenue allocation among the various parties based on a measured metric of the eBook or other content item. The revenue allocation system 128 has an allocation function/calculator 130 that allocates revenues according to one or more allocation models 230(1), . . . , 230(M). Each of the allocation models 230(1)-(M) allows for periodic adjustment of the allocations among the parties based on the measured metric. In general, allocation models 230(1)-(M) allow for the rights holder(s) to earn a higher portion of the revenue generated from eBook transactions as the common work rises in rank, such as by moving up a sales list or appearing on or moving up a bestsellers list. Example allocation models 230(1)-(M) are described below in more detail with reference to FIGS. 3-4.

The revenue allocation system 128 further includes a reporting module 232 that compiles information pertaining to revenue receipts and allocation calculations performed by the allocation function/calculator 130. The reporting module 232 may be configured to generate periodic reports containing the information and distributing those reports to the rights holder(s) 102. Alternatively, the reporting module 232 may provide the information in real-time to a requesting rights holder 102 via a user interface, such as a browser-based interface. In this manner, the rights holder 102 may access up-to-date information pertaining to revenue allocation at any time by simply accessing the eBook service 110 over a network from a computer.

Figure 3:
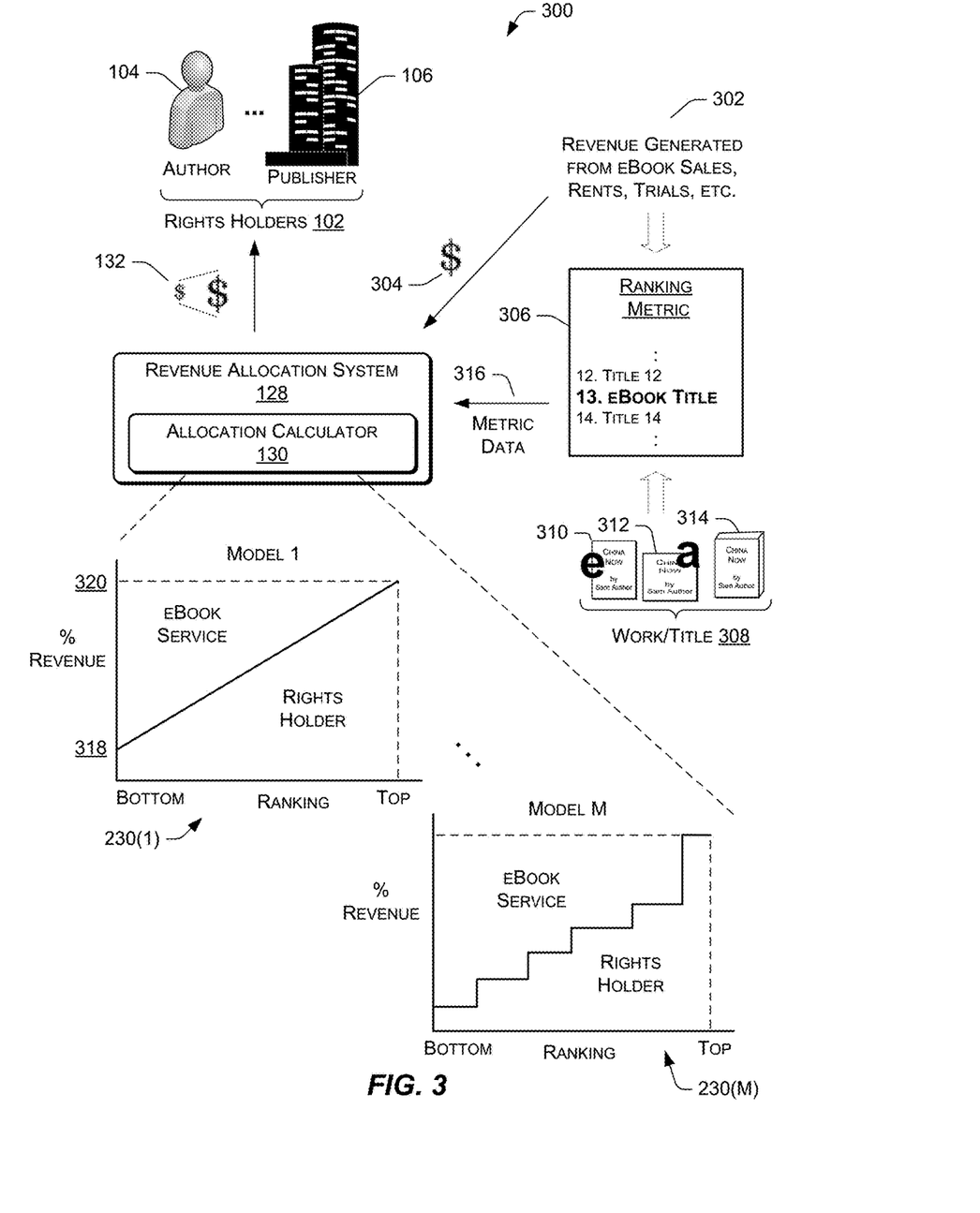
FIG. 3 illustrates representative models that may be employed by the computing system of FIG. 2 for determining revenue allocation to the rights holders.

FIG. 3 illustrates a computing environment 300 in which representative allocation models 230(1)-(M) may be employed by the allocation function/calculator 130 of the revenue allocation system 128 when allocating revenue. In environment 300, revenue 302 is generated from transactions involving eBooks, such as sales, rentals, leases, samples, views and so on. Revenue data 304 is provided to the revenue allocation system 128, as graphically illustrated in FIG. 3 by the "$" sign. Additionally, the revenue data 304 may be provided as input to a ranking metric 306. As noted above, the ranking metric 306 may be any type of metric by which to measure the eBook. Such ranking metrics may include, for example, sales in revenue or volume, sales velocity, revenue total or velocity and so forth.

The ranking metric 306 may be derived as a function of an eBook metric alone, as a function of the metric for some or all derivatives of a common work or title or even a collection of related works or titles (e.g., written by a common author). As shown in FIG. 3, a work or title 308 may have many derivatives including, for example, an electronic book version 310, an audio book version 312 and a hard or soft cover paper-based version 314. The metrics of these versions collectively may also be used to discern ranking, illustrated as an input to the ranking metric 306. As metrics are measured, metric data 316 from the ranking metric 306 is provided to the revenue allocation system 128.

The revenue allocation system 128 thus collects and aggregates the revenue data 304 and the metric data 316 for use in determining allocation of the revenue generated through transactions involving the eBook. In some embodiments the revenue allocation system 128 allocates and aggregates revenue and metric data 316 for use in determining allocation of the revenue generated through transactions involving any form of the common work.

The revenue allocation system 128 relies on the allocation function/calculator 130 to allocate portions of revenue, and particularly the portion due to the rights holder(s) 102. The allocation function/calculator 130 employs one or more allocation models 230(1)-(M) to periodically adjust the portion of revenue to be provided to the rights holder(s) 102 based on the metric data 316, such as a ranking in the ranking metric 306. Generally, in one embodiment the allocation models 230(1)-(M) enable the rights holder(s) 102 to earn a larger share of the revenue from the eBook transactions as the corresponding eBook or common work as a whole improves in rank. There are many different ways to model allocation, and two examples are illustrated.

One representative allocation model 230(1) shows a linear relationship between a measured metric and revenue share allocated to the rights holder(s) 102. The amount allocated to the rights holder(s) 102 varies between a lower percentage 318 and an upper percentage 320. The actual percentage values may be any values negotiated by the rights holder(s) 102 and other parties, such as the eBook service 110. As one example, the upper percentage may be as high as 100% of the revenue generated from the eBook transactions if the work achieves a selected, negotiated or otherwise defined threshold rank, such as being added to a bestseller list, rising to a certain ranking on a list, passing through a certain volume of sales or meeting a target for sales velocity.

Another representative allocation model 230(M) shows a non-linear, step-wise relationship, where the portion allocated to the rights holder(s) 102 changes non-linearly upon achieving certain metric thresholds. In this way, the incentives are more heavily weighted on achieving each threshold.

The allocation function/calculator 130 receives the revenue data 304 and the metric data 316 and, using one or more models 230(1)-(M), ascertains the portion of revenue 302 to be paid to the rights holder(s) 102. The portion allocated to the rights holder(s) 102 is periodically adjusted based on these metrics, as indicated graphically by the changing "$" sign 132. Moreover, the allocation function/calculator 130 may aggregate the data and compute the allocation in real-time, allowing for the revenue allocations to be adjusted in real-time. Alternatively, the revenue allocation may be periodically adjusted at prescribed intervals, such as daily, weekly or quarterly. If there is more than one rights holder, the allocations may be determined for the rights holders collectively or for each rights holder individually. In FIG. 3, two rights holders are shown—author 104 and publisher 106—but other people or entities may also be rights holders, such as agents, assignees, heirs and so on.

Figure 4:
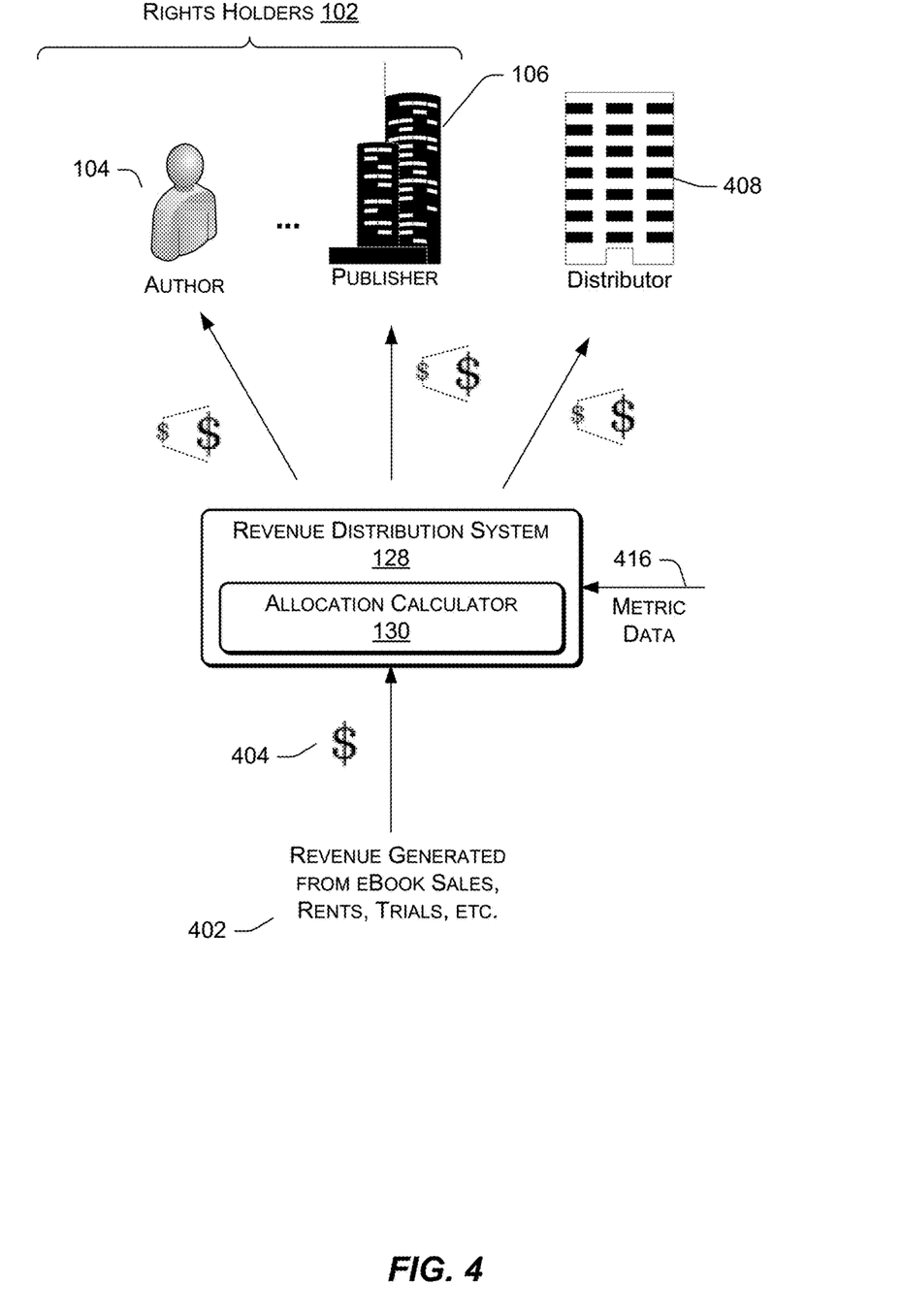
FIG. 4 illustrates representative models that may be employed by the computing system of FIG. 2 for determining revenue allocation to multiple rights holders.

FIG. 4 illustrates a further view of the computing environment 300 (FIG. 3) in which the revenue allocation system 128 allocates revenue to multiple parties. As with the embodiment described in FIG. 3, revenue 402 is generated from transactions involving eBooks, such as sales, rentals, leases, samples, views and so on. Revenue data 404 is provided to the revenue allocation system 128, as graphically illustrated in FIG. 4 by the "$" sign 404.

The revenue allocation system 128 thus collects and aggregates the revenue data 404 and the metric data 416 for use in determining allocation of the revenue 402 generated through transactions involving the eBook. The revenue allocation system 128 relies on the allocation function/calculator 130 to allocate portions of revenue, and particularly the portion due to the rights holder(s) 102. As described with respect to FIG. 3, the allocation function/calculator 130 employs one or more allocation models 230 (1)-(M) to periodically adjust the portion of revenue to be allocated between the rights holder(s) 102 and distributors 408.

The revenue allocation system 128 may further use one or more allocation models 230 (1)-(M) to further allocate revenue between specific rights holders, such as an author 104 and a publisher 106. The allocation between each rights holder 102 may be specified by the rights holders 102 themselves or based upon predefined agreements. In addition, the allocation between each rights holder 102 and the allocation model used may change over time and/or as the allocation of revenue to the rights holders 102 changes. For example, initial revenue allocated to rights holders 102 may initially be mostly allocated to the publisher 106 until an advance provided to the author 104 is recovered. After the advance is recovered, the allocation of revenue between the author 104 and the publisher 106 may alter, with the author 104 receiving a larger percentage of the revenue allocated to the rights holders 102. Any combination and variation of allocation between rights holders 102 of allocated revenue may be utilized with embodiments of the present invention.

Figure 5:
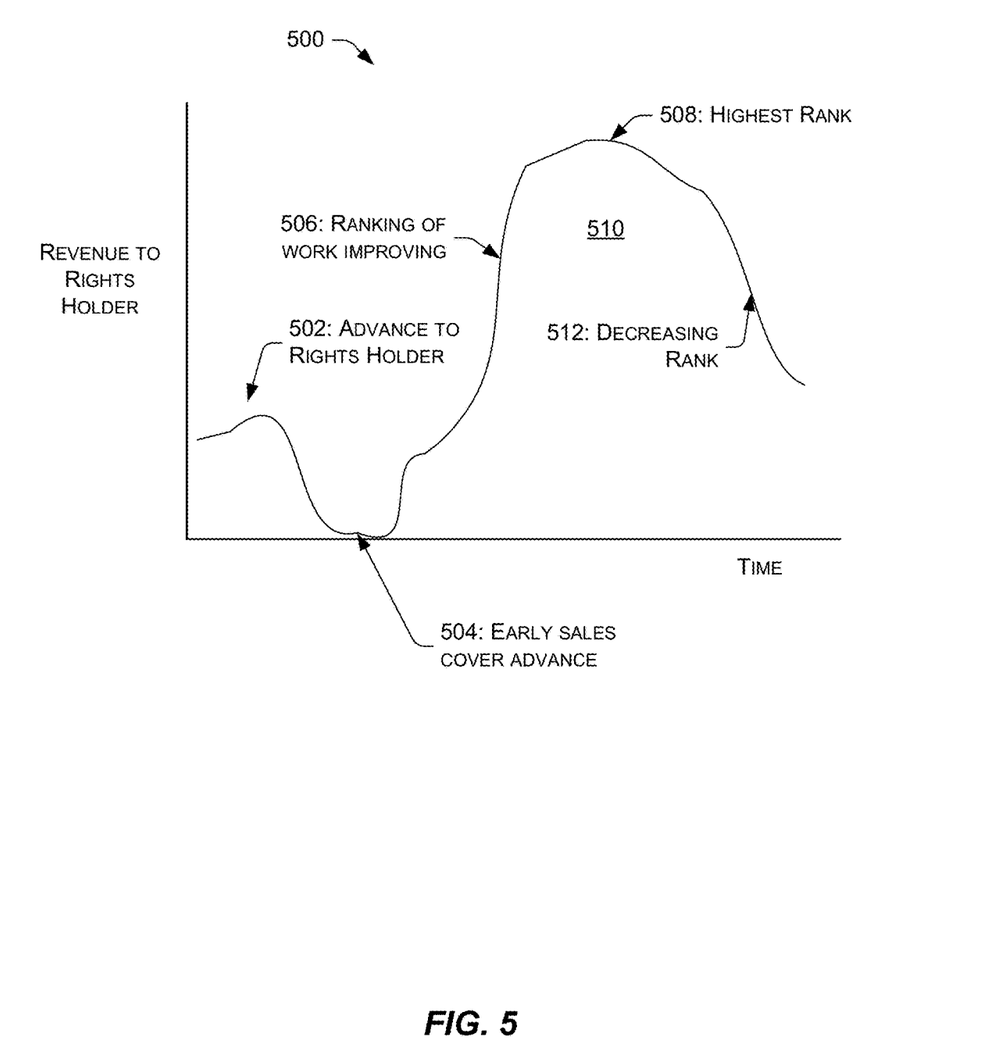
FIG. 5 shows one possible compensation scenario for a rights holder who is receiving a periodically adjusted portion of revenue.

FIG. 5 shows one possible revenue scenario 500 for a rights holder who is receiving a periodically adjusted portion of revenue over a time period, such as a life of a work. Suppose, for example, the rights holder is a publisher who has chosen to publish a manuscript as an electronic book for distribution through the eBook service 110 (FIG. 1). In scenario 500, the rights holder (publisher) is paid an advance as an enticement to use the eBook service 110, as shown by point 502. During initial sales, the revenue is allocated to the eBook service 110, rather than the rights holder, as the advance is recovered at point 504. This dynamic is accounted for in the allocation models 230 (1)-(M) as the rights holder receives a lower percentage of revenue when the ranking is low, such as when a book first starts selling. Over time, however, the work performs better. If the ranking metric is sales, the work may begin climbing/moving up a sales list, as indicated by upward curve 506. Eventually, the work achieves its highest ranking at point 508. During this time, the rights holder is allocated an increasingly greater portion of the revenue, allowing the rights holder to accumulate a significant share of the revenue, as indicated by the large area 510 under the curve. As ranking begins to wane, the revenue percentage for the rights holder begins to fall again, as noted by the falling curve 512.

Figure 6:
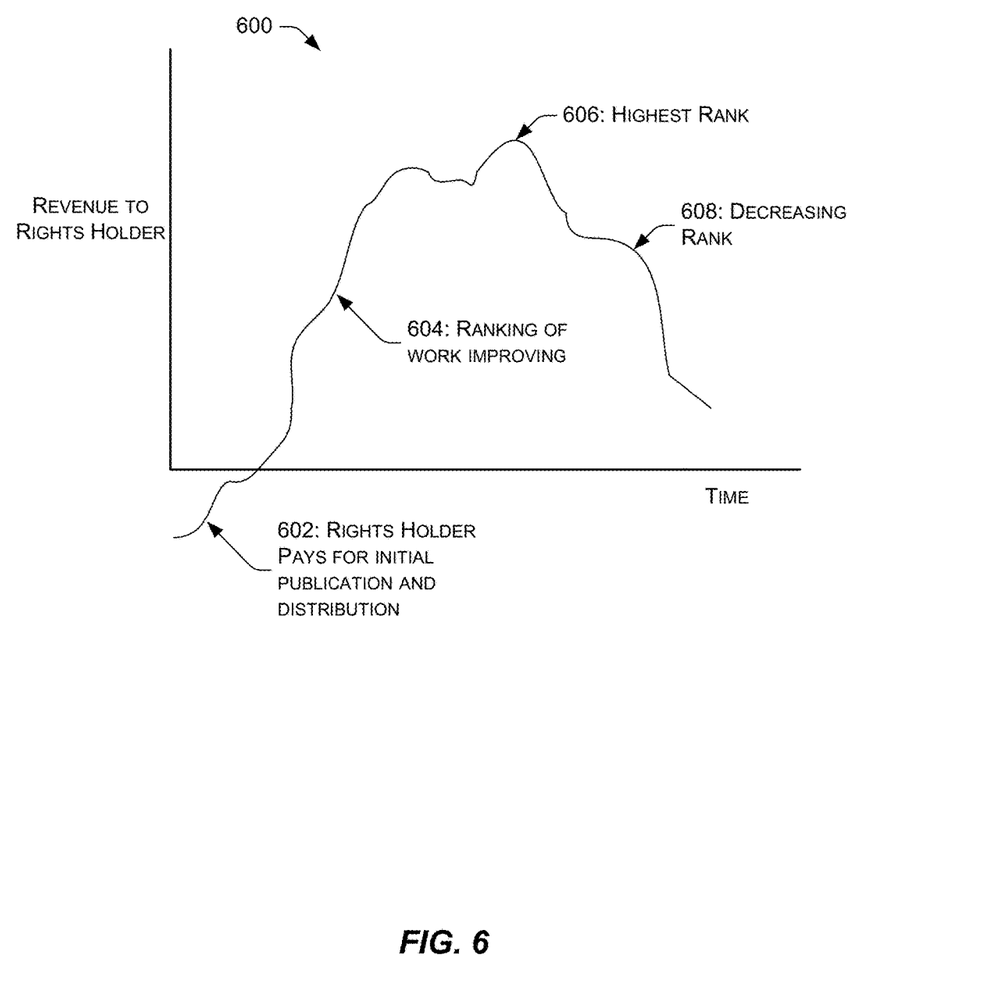
FIG. 6 shows another possible compensation scenario for a rights holder who is receiving a periodically adjusted portion of revenue.

FIG. 6 shows another possible revenue scenario 600 for a rights holder 102 who is being allocated a periodically adjusting portion of revenue. In this scenario, suppose that the rights holder 102 is an author who has chosen to self publish a work as an electronic book for distribution through the eBook service 110. Unlike scenario 500, the author in scenario 600 may not be well known, and hence is not awarded an advance. Instead, the author pays the eBook service 110 to format, publish and distribute the work. Accordingly, the author's return is initially negative as generally indicated at point 602.

As ranking improves, the revenue allocated to the author begins to change according to one or more of the allocation models 230(1)-(M). This is represented by upward sloping curve 604. The author is allocated the largest portion of revenue at the highest ranking, as indicated at point 606. As ranking begins to wane, the revenue percentage for the author begins to fall again, as noted by a negative sloping curve 608. Utilizing another allocation model, for example, the author's allocation may remain fixed once a defined or selected ranking is attained.

Many other revenue scenarios are possible. Scenarios 500 and 600 are merely representative and not limiting.

The allocation of revenue may be periodically adjusted in real-time or at predetermined intervals (e.g., hourly, daily, weekly). Additionally, the allocation of revenue to rights holders may be directly or inversely correlated with ranking. While the above examples describe a direct correlation, other embodiments are envisioned in which the percentage of revenue allocated to rights holders 102 may decrease as the ranking rises and increase as the ranking falls.

As revenue allocation is adjusted, the rights holders may wish to track these changes to learn how much revenue is due to them. The rights holders may receive periodic reports or may be permitted access to view revenue data in real-time. One such reporting system is described below with reference to FIG. 7.

Figure 7:
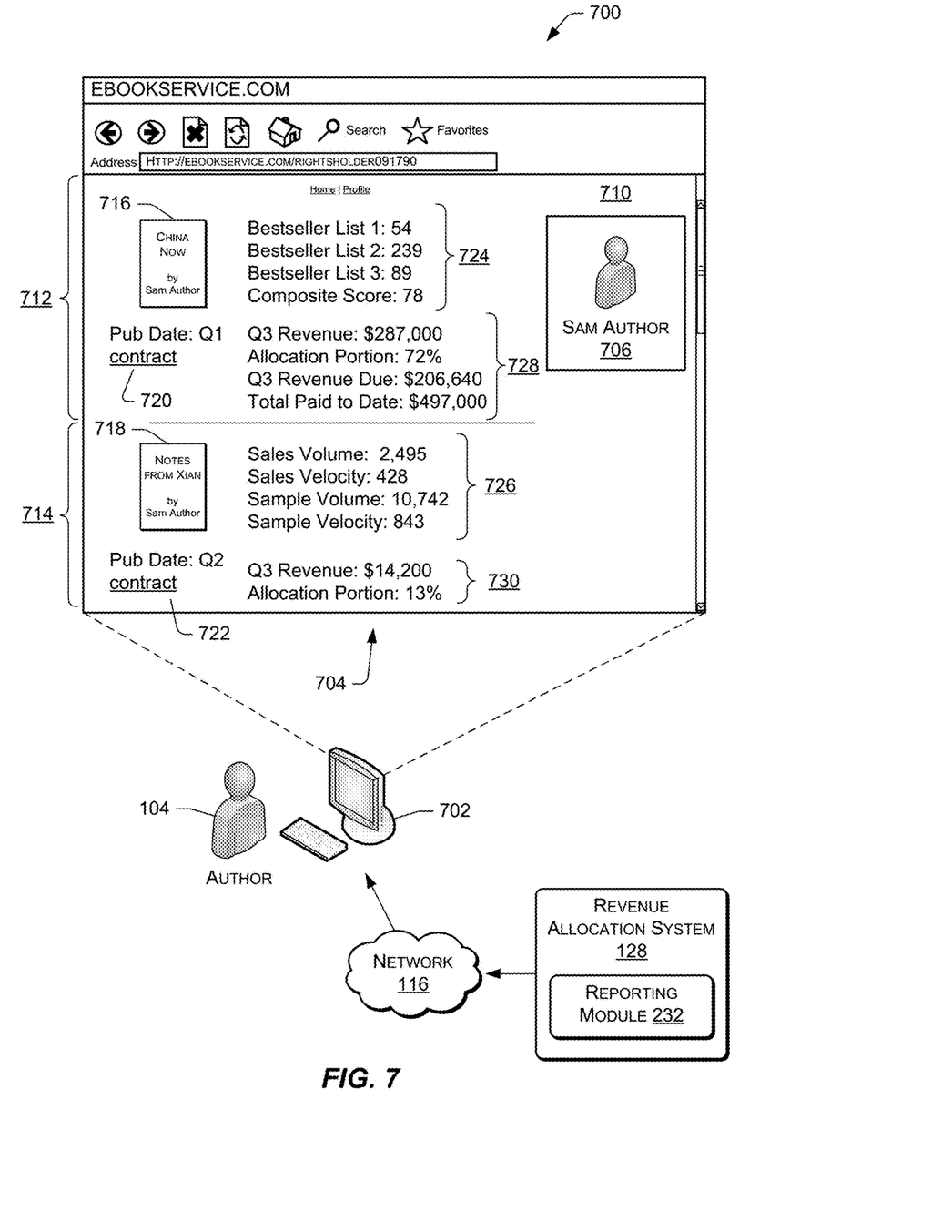
FIG. 7 illustrates an online reporting structure that utilizes a user interface through which a rights holder may review real-time data pertaining to metrics and revenue allocation.

FIG. 7 shows an online reporting arrangement 700 for reporting revenue allocation information to a rights holder. The revenue allocation system 128 has a reporting module 232 that permits the rights holders, such as the author 104, to access current information pertaining to revenues generated by transactions involving the eBook and the allocation of the revenue. The author 104 may access the data provided by the reporting module 232 via a computing device, such as a desktop computer 702, over the network 116. The computer 702 may run a browser that requests and renders web pages to form a reporting user interface (UI) 704. Thus, in this example series, the screen renderings are illustrated as web pages within a browser. However, this is merely one possible implementation, and other technologies may be employed to facilitate a reporting user interface 704.

In one implementation, the reporting module 232 may send out alerts to the author 104 as revenue hits certain thresholds or as the allocations are adjusted. These alerts may include a link that, when actuated by the author 104, may direct the author's browser to the reporting UI 704.

The reporting UI 704 provides customized interfaces for individual rights holders. Here, the UI 704 provides a revenue report for the author 104. An identity tile 706 is provided with an image of Sam Author (if one exits) and any pertinent information, such as his contact information (residence, phone number, etc.).

One or more of the author's eBooks are listed in a primary screen area 710. Each eBook listing is set apart in a title report region, which is a sub-part of the primary screen area 710. Two title report regions 712 and 714 are shown in FIG. 7, separated by a demarcation line. A first title report region 712 is provided for the eBook entitled "China Now," as represented by the thumbnail image 716. The second title report region 714 is provided for the second eBook entitled "Notes from Xian," as represented by the image 718. Details for each eBook in the list may also be included, such as the publication date (as shown), copyright number, number of pages and so forth. Additionally, associated with each eBook is the corresponding contract that defines the revenue model used to manage revenue allocation for that eBook. In FIG. 7, each contract is accessible via a link, as represented by link 720 for the eBook "China Now" and link 722 for the eBook "Notes from Xian." Actuation of the links 720 and 722 allow the author 104 to review the terms by which the revenue allocation is being ascertained.

Each title report region 712 and 714 includes metric information for the corresponding eBook or work as a whole. In title report region 712, metric information 724 consists of a set of rankings captured from various lists. More particularly, the metric information 724 for the eBook "China Now" includes ranking data from three lists, as well as a composite score derived from the various list rankings. This metric information 724 forms the basis on which the revenue generated from transactions of the eBook "China Now" is allocated to the author 104.

Similarly, the title report region 714 includes metric information 726 for the eBook "Notes from Xian." Notice that the metric information for this work is different, measured by sales volume and velocity and additionally by sample volume and velocity. Accordingly, the revenue generated by transactions involving the eBook "Notes from Xian" are allocated according to a different set of metrics.

In addition to metric information 724 and 726, each title report region 712 and 714 further includes revenue information. The revenue information may consist of essentially any information useful to the rights holder to determine the amounts to be allocated. In the title report region 712, revenue information 728 includes the allocation percentage of the revenue being allocated to the author 104, the revenue generated in the third quarter, the amount of revenue due to the author 104 and the total amount paid to date. In the second title report region 714, revenue information 730 includes the same type of data, such as allocation percentage and revenue generated in the third quarter. The remaining two fields—revenue due and paid-to-date—are not shown in this view, but would become visible as the rights holder scrolls down the UI 704. The revenue information 728 and 730 is merely illustrative, and other types of information may be alternatively used.

Accordingly, through the use of this reporting UI 704, a rights holder has a convenient window into the real-time results as to how well their works are performing and how much revenue is being allocated to them at any given time.

In examples where revenue is allocated among multiple rights holders, each rights holder may have a separate reporting UI, similar to the one illustrated in FIG. 7, which is specific to that rights holder. In one configuration, the UI 704 may include an additional reporting line identifying the amount of revenue that is allocated to other rights holders for the displayed work.

Figure 8:
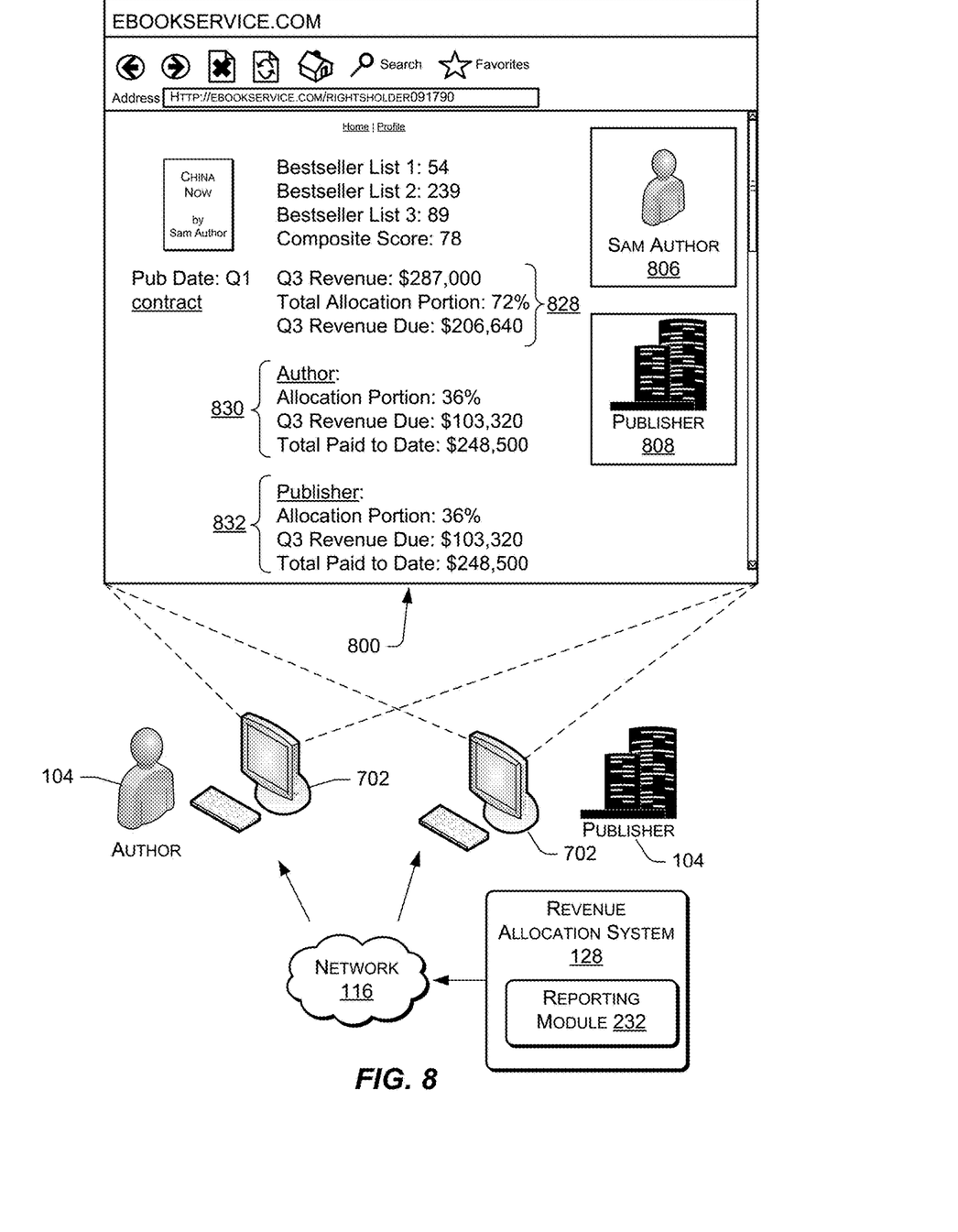
FIG. 8 illustrates an online reporting structure that utilizes a user interface through which multiple rights holders may review real-time data pertaining to metrics and revenue allocation.

In yet another embodiment, as illustrated in FIG. 8, a single UI 800 may be provided that is accessible by all rights holders for the relevant work. For each relevant rights holder, an identity tile 806, 808 is provided. For example, an identity tile 806 may be provided with an image of Sam Author (if one exits) and any pertinent information, such as his contact information. In a similar manner, an identity tile 808 may be provided for the publisher of the eBook.

In embodiments in which a single UI 800 is provided to multiple rights holders, the allocation of revenue is illustrated as a total revenue allocation and a total amount due, each as illustrated in the total revenue region 828. In addition, the revenue allocation may be broken down by rights holder. For example, each rights holder is provided a rights holder revenue region 830, 832 that specifies the percentage of the revenue allocated to that rights holder as well as the amount of revenue due to that rights holder. While the example illustrated in FIG. 8 shows the revenue allocation between the author and the publisher as being equal, any allocation may be utilized. In addition the amount of revenue allocated to each rights holder may vary over time, as sales change or based on any other criteria.

Figure 9:
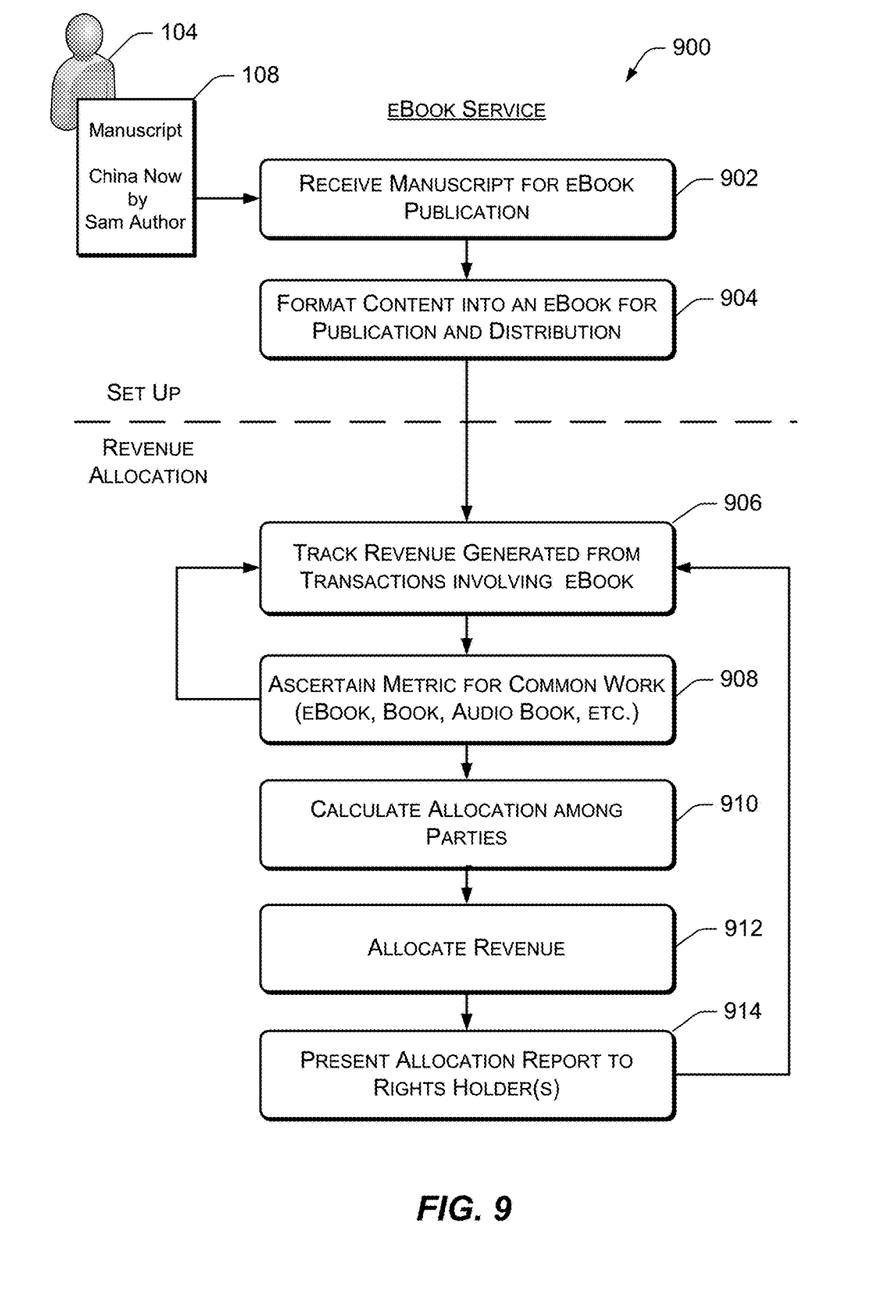
FIG. 9 is a flow diagram of an example process of facilitating distribution of an electronic book and periodically adjusting an amount of revenue due to the rights holder according to one or more metrics.

FIG. 9 shows a general process 900 of facilitating distribution of an electronic book and periodically adjusting revenue due to the rights holder in real-time according to metrics measured for the electronic book and/or corresponding derivates of the work. The process 900 is illustrated as a collection of blocks in a logical flow graph, which represent a sequence of operations that can be implemented in hardware, software or a combination thereof. In the context of software, the blocks represent computer-executable instructions that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation, and any number of the described blocks can be combined in any order and/or in parallel to implement the process.

The process 900 is divided into two phases: a set up phase and a revenue allocation phase. These phases are separated in FIG. 9 by a dashed line. For discussion purposes, the process 900 is described with reference to the architecture 100 of FIG. 1 and the computing system 200 of FIG. 2. Additional reference may be made to the allocation models in FIG. 3 and the reporting UI in FIG. 7.

At 902, during the set up phase, the eBook service 110 receives a manuscript for publication as an electronic book. Continuing the example from FIG. 1, the author 104 might submit the manuscript 108 for "China Now" to the eBook service 110. The manuscript may be in electronic form, such as a word processing document saved in a storage medium or in a physical form, such as a paper print out.

At 904, content from the manuscript is formatted to create an electronic book that can be published and distributed. There are various formatting standards that may be used, and the work may be formatted into multiple electronic formats so that the work may be distributed to different types of reader devices. At this point, the set up phase is complete, and the eBook is ready for marketing on a retailer site and for electronic distribution upon request.

At 906, during the revenue allocation phase, any revenue generated from transactions involving the eBook is tracked. Possible transactions include sales, leases, rentals, trials, samples, viewings, options or essentially any interaction with the work that might results in payment of value. With reference to FIG. 1, the revenue allocation system 128 of the eBook service 110 monitors the revenue generated by the eBook transactions. The eBook service 110 may further collect revenue (e.g., sale of an eBook) or merely act as the data tracking service.

At 908, a metric for the work is ascertained. The metric may be measured in any number of ways, including lifetime sales, total revenue generated, total downloads, total sample downloads, sales velocity, average review of the electronic book and so forth. In one example, a metric may be measured by rankings on lists, such as sales lists, bestseller lists and so on. In the system 200 (FIG. 2), the metric ranking module 226 evaluates the eBook alone or the work as a whole across all types of derivatives (e.g., hardcover, paperback, audio book), according to position on one or more lists 228(1)-(L).

In certain implementations, the sales revenue is the metric being measured. As a result, the revenue being tracked at 906 is used in part to ascertain the metric for the work. As revenue changes, the metric is recomputed, causing a real-time updating mechanism to ensure the data used for allocation calculations is current. This is represented by the feedback loop from act 908 to act 906.

At 910, allocation of the revenue among the parties, including the rights holder(s), is calculated based on the metric ascertained in act 908. In one implementation, as described above with respect to FIG. 3, the allocation function/calculator 130 employs one or more models to calculate allocation of revenue. In one embodiment, a greater share of the revenue generated from the eBook transactions are allocated to the rights holder(s) as the metric improves. For instance, suppose the metric is measured by position on a sales list. In this case, the allocation amount to the rights holder(s) increases as the work rises in the ranking on the sales list. At 912, any revenue collected is allocated according to the allocation calculated at act 910.

At 914, an allocation report may be presented or otherwise made available to the rights holder(s). In one implementation, the allocation report is made available through a user interface, such as the UI 704 shown in FIG. 7. In UI 704, the rights holder(s) may review metric data, revenue data and their share of the revenue. The rights holder(s) may access the information at any time using a browser, thereby enabling the rights holder(s) to see the current status of the metric and revenue data in real-time. The allocation report may be updated continuously as the revenue information and metric data changes, as indicated by the feedback loop from act 914 to act 906. Furthermore, with each update, the allocation of revenue may change due to the model, thereby allowing the eBook service 110 to periodically adjust the amount of revenue due to the rights holder(s) as the various factors change and in real-time.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method for revenue allocation, comprising:
   under control of one or more computers configured with specific executable instructions, generating, based at least in part on a work, an electronic book;
   providing the electronic book to one or more electronic devices using an online marketplace;
   receiving first revenue from a first transaction that includes the electronic book;
   determining a first ranking of a first physical book relative to a second physical book, wherein content of the first physical book is based upon the work;
   determining, based at least in part on the first ranking, a first allocation for the first revenue to a rights holder of the electronic book;
   allocating, based in part on the first allocation, to the rights holder of the electronic book, a portion of the first revenue;
   receiving second revenue from a second transaction that includes the electronic book;
   determining a second ranking of the first physical book relative to at least one of the second physical book or a third physical book; and
   determining, based at least in part on the second ranking, a second, different allocation for the second revenue from the second transaction of the electronic book to the rights holder of the electronic book.

2. The computer-implemented method of claim 1, wherein the first transaction comprises at least one of a sale, a lease, a rental, a trial, a viewing, a subscription or an option.

3. The computer-implemented method of claim 1, wherein the determining of the first ranking comprises determining a position of the first physical book relative to the second physical book on at least one third-party list.

4. The computer-implemented method of claim 1, wherein the determining of the first ranking is based at least in part on at least one of sales from a seller, sales from multiple sellers, sales volume, or sales volume during a specified time-frame.

5. The computer-implemented method of claim 1, wherein the rights holder of the electronic book comprises at least one of an author or a publisher of the electronic book.

6. The computer-implemented method of claim 1, further comprising determining that the second ranking exceeds a specified ranking, and wherein the second allocation of the second revenue to the rights holder of the electronic book comprises all of the second revenue based at least in part on the second ranking exceeding the specified ranking.

7. The computer-implemented method of claim 1, further comprising allocating, to the rights holder and based at least in part on the second allocation, a second portion of the second revenue.

8. The computer-implemented method of claim 1, further comprising allocating a second portion of the first revenue to one or more parties other than the rights holder, wherein the one or more parties includes at least one of a retailer that markets the electronic book, an agent for the rights holder of the electronic book, or a distributor of the electronic book.

9. A non-transitory computer-readable storage media storing computer-readable instructions that, when executed, configure a processor to perform acts comprising:
   generating, based at least in part on a work, an electronic book;
   providing the electronic book to one or more electronic devices using an online marketplace;
   receiving first revenue from a first transaction that includes the electronic book;
   determining, at a first period of time, a first ranking of a first physical book relative to a second physical book, wherein content of the first physical book is based at least in part on the work;
   determining, based at least in part on the first ranking, a first allocation of the first revenue from the first transaction that includes the electronic book to a rights holder of the electronic book;
   allocating, based at least in part on the first allocation, to the rights holder of the electronic book, a portion of the first revenue from the first transaction that includes the electronic book;
   receiving second revenue from a second transaction that includes the electronic book;
   determining, at a second period of time, a second ranking of the first physical book relative to at least one of the second physical book or a third physical book; and
   based at least in part on the second ranking of the first physical book, determining a second, different allocation for the second revenue from the second transaction that includes the electronic book to the rights holder of the electronic book.

10. The non-transitory computer-readable storage media of claim 9, wherein the first transaction comprises at least one of a sale, a lease, a rental, a trial, a viewing, a subscription or an option.

11. The non-transitory computer-readable storage media of claim 9, wherein the determining of the first ranking comprises determining a position of the first physical book relative to the second physical book on at least one third-party list.

12. The non-transitory computer-readable storage media of claim 9, wherein the determining of the first ranking is based at least in part on at least one of sales from a seller, sales from multiple sellers, or sales volume during at least one of the first period of time or a third period of time.

13. The non-transitory computer-readable storage media of claim 9, wherein the rights holder of the electronic book comprises at least one of an author of the electronic book or a publisher of the electronic book.

14. The non-transitory computer-readable storage media of claim 9, the acts further comprising determining that the second ranking exceeds a threshold, and wherein the second allocation of the second revenue to the rights holder of the electronic book comprises all of the second revenue based at least in part on the second ranking exceeding the threshold.

15. The non-transitory computer-readable storage media of claim 9, the acts further comprising allocating a second portion of the first revenue among one or more parties other than the rights holder of the electronic book.

16. The non-transitory computer-readable storage media of claim 15, wherein the one or more parties includes at least one of a retailer that markets the electronic book, an agent for the rights holder of the electronic book, or a distributor of the electronic book.

17. An architecture comprising:
   a processor;
   a memory operably coupled to the processor, the memory storing computer-executable instructions to configure the coupled processor to perform operations comprising:
      generating, based at least in part on a work, an electronic book;
      providing the electronic book to one or more electronic devices using an online marketplace;
      receiving first revenue from a first transaction that includes the electronic book;
      determining, at a first period of time, a first ranking of a first physical book relative to a second physical book, wherein content of the first physical book is based at least in part on the work;
      determining, based at least in part on the first ranking, a first allocation of the first revenue from the first transaction that includes the electronic book to a rights holder of the electronic book;
      allocating, based at least in part on the first allocation, to the rights holder of the electronic book, a portion of the first revenue from the first transaction that includes the electronic book;
      receiving second revenue from a second transaction that includes the electronic book;
      determining, at a second period of time, a second ranking of the first physical book relative to at least one of the second physical book or a third physical book; and
      based at least in part on the second ranking of the first physical book, determining a second, different allocation of the second revenue from the second transaction that includes the electronic book to the rights holder of the electronic book.

18. The architecture of claim 17, wherein the first transaction comprises at least one of a sale, a lease, a rental, a trial, a viewing, a subscription, or an option.

19. The architecture of claim 17, wherein the determining of the first ranking comprises determining a position of the first physical book relative to the second physical book on at least one third-party list.

20. The architecture of claim 17, wherein the determining of the first ranking is based at least in part on at least one of sales from a seller, sales from multiple sellers, or sales volume during at least one of the first period of time or a third period of time.

21. The architecture of claim 17, wherein the rights holder of the electronic book comprises at least one of an author of the electronic book or a publisher of the electronic book.

22. The architecture of claim 17, the operations further comprising determining that the second ranking exceeds a specified ranking, and wherein the second allocation of the second revenue to the rights holder of the electronic book comprises all of the second revenue based at least in part on second ranking exceeding the specified ranking.

23. The architecture of claim 17, the operations further comprising allocating a second portion of the first revenue among one or more parties other than the rights holder of the electronic book.

24. The architecture of claim 23, wherein the one or more parties includes at least one of a retailer that markets the electronic book, an agent for the rights holder of the electronic book, or a distributor of the electronic book.

25. The computer-implemented method of claim 1, wherein the rights holder of the electronic book is different than a rights holder of the first physical book.

26. The non-transitory computer-readable storage media of claim 9, wherein the rights holder of the electronic book is different than a rights holder of the first physical book.

27. The architecture of claim 17, wherein the rights holder of the electronic book is different than a rights holder of the first physical book.

\* \* \* \* \*